US007585420B2

(12) United States Patent
Wang et al.

(10) Patent No.: US 7,585,420 B2
(45) Date of Patent: Sep. 8, 2009

(54) CARBON NANOTUBE SUBSTRATES AND CATALYZED HOT STAMP FOR POLISHING AND PATTERNING THE SUBSTRATES

(75) Inventors: Yuhuang Wang, Evanston, IL (US); Robert H. Hauge, Houston, TX (US); Howard K. Schmidt, Houston, TX (US); Myung Jong Kim, Houston, TX (US); W. Carter Kittrell, Houston, TX (US)

(73) Assignee: William Marsh Rice University, Houston, TX (US)

( * ) Notice: Subject to any disclaimer, the term of this patent is extended or adjusted under 35 U.S.C. 154(b) by 107 days.

(21) Appl. No.: 11/300,031

(22) Filed: Dec. 14, 2005

(65) Prior Publication Data

US 2008/0105648 A1    May 8, 2008

Related U.S. Application Data

(60) Provisional application No. 60/636,727, filed on Dec. 16, 2004.

(51) Int. Cl.
*H01B 13/00* (2006.01)
*C03C 25/68* (2006.01)

(52) U.S. Cl. .............................. 216/13; 216/58; 216/63; 216/89; 977/745

(58) Field of Classification Search .................... None
See application file for complete search history.

(56) References Cited

U.S. PATENT DOCUMENTS

| 5,874,166 | A | | 2/1999 | Chu et al. | |
|---|---|---|---|---|---|
| 6,097,138 | A | * | 8/2000 | Nakamoto | 313/309 |
| 2002/0159943 | A1 | * | 10/2002 | Smalley et al. | 423/447.1 |
| 2003/0042922 | A1 | * | 3/2003 | Houge et al. | 324/761 |
| 2003/0094035 | A1 | * | 5/2003 | Mitchell | 73/105 |
| 2003/0178617 | A1 | * | 9/2003 | Appenzeller et al. | 257/20 |
| 2004/0023253 | A1 | * | 2/2004 | Kunwar et al. | 435/6 |
| 2004/0213910 | A1 | * | 10/2004 | Cai et al. | 427/299 |
| 2004/0255652 | A1 | * | 12/2004 | Lee et al. | 73/105 |
| 2005/0017171 | A1 | * | 1/2005 | Samuelson et al. | 250/306 |

(Continued)

OTHER PUBLICATIONS

International Preliminary Report on Patentability (PCT/US05/45740), dated Apr. 4, 2007.

(Continued)

*Primary Examiner*—Allan Olsen
(74) *Attorney, Agent, or Firm*—Winstead PC

(57) ABSTRACT

The present invention is generally directed to catalyzed hot stamp methods for polishing and/or patterning carbon nanotube-containing substrates. In some embodiments, the substrate, as a carbon nanotube fiber end, is brought into contact with a hot stamp (typically at 200-800° C.), and is kept in contact with the hot stamp until the morphology/patterns on the hot stamp have been transferred to the substrate. In some embodiments, the hot stamp is made of material comprising one or more transition metals (Fe, Ni, Co, Pt, Ag, Au, etc.), which can catalyze the etching reaction of carbon with $H_2$, $CO_2$, $H_2O$, and/or $O_2$. Such methods can (1) polish the carbon nanotube-containing substrate with a microscopically smooth finish, and/or (2) transfer pre-defined patterns from the hot stamp to the substrate. Such polished or patterned carbon nanotube substrates can find application as carbon nanotube electrodes, field emitters, and field emitter arrays for displays and electron sources.

27 Claims, 2 Drawing Sheets

U.S. PATENT DOCUMENTS

| | | | |
|---|---|---|---|
| 2005/0112048 A1* | 5/2005 | Tsakalakos et al. | 423/439 |
| 2006/0008942 A1* | 1/2006 | Romano et al. | 438/99 |
| 2006/0028966 A1* | 2/2006 | Szu | 369/126 |
| 2006/0057388 A1* | 3/2006 | Jin et al. | 428/408 |
| 2006/0246467 A1* | 11/2006 | Wade et al. | 435/6 |

OTHER PUBLICATIONS

Iijima, "Helical microtubules of graphitic carbon", 354 Nature (1991), pp. 56-58.

Iijima et al., "Single-shell carbon nanotubes of 1-nm diameter", 363 Nature (1993), pp. 603-605.

Bethune et al., "Cobalt-catalysed growth of carbon nanotubes with single-atomic-layer walls", 363 Nature (1993), pp. 605-607.

Baughman et al., "Carbon Nanotubes—the Route Toward Applications", 297 Science (2002), pp. 787-792.

Thess et al., "Crystalline Ropes of Metallic Carbon Nanotubes", 273 Science (1996), pp. 483-487.

Ericson et al., "Macroscopic, Neat, Single-Walled Carbon Nanotube Fibers", 305 Science (2004), pp. 1447-1450.

Zhang et al., "Multifunctional Carbon Nanotube Yarns by Downsizing an Ancient Technology", 306 Science (2004), pp. 1358-1361.

Ren et al., "Synthesis of Large Arrays of Well-Aligned Carbon Nanotubes on Glass", 282 Science (1998), pp. 1105-1107.

Hata et al., "Water-Assisted Highly Efficient Synthesis of Impurity-Free Single-Walled Carbon Nanotubes", 306 Science (2004), pp. 1362-1364.

Bronikowski et al., "Gas-phase production of carbon single-walled nanotubes . . ." 19 (4) J. Vac. Sci. Technol. (2001), pp. 1800-1805.

Nikolaev et al., "Gas-phase catalytic growth of single-walled carbon nanotubes from carbon monoxide", 313 Chem. Phys. Lett. (1999), pp. 91-97.

Gu et al., "Cutting Single-Wall Carbon Nanotubes through Fluorination" 2 (9) Nano Lett. (2002), pp. 1009-1013.

Ziegler et al., "Controlled Oxidative Cutting of Sinlge-Walled Carbon Nanotubes", 127 J. Am. Chem. Soc. (2005), pp. 1541-1547.

Chiang et al., "Purification and Characterization of Single-Walled Carbon Nanotubes", 105 J. Phys. Chem. B (2001), pp. 1157-1161.

Chiang et al., "Purification and Characterization of Single-Walled Carbon Nanotubes Obtained from the Gas-Phase Composition . . ." 105 J. Phys. Chem. B (2001), pp. 8297-8301.

Heller et al., "Concomitant Length and Diameter Separation of Single-walled Carbon nanotubes", 126 J. Am Chem. Soc. (2004), pp. 14567-14573.

Krupke et al., "Separation of Metallic from Semiconducting Single-Walled Carbon Nanotubes" 301 Science (2003), pp. 244-347.

Ying et al., "Functionalization of Carbon Nanotubes by Free Radicals", 5 (9) Org. Letters (2003), pp. 1471-1473.

Bahr et al., "Functionalization of Carbon Nanotubes by Electrochemical Reduction of Aryl Diazonium Salts: A Bucky Papers Electrode" 123 J. Am. Chem. Soc. (2001), pp. 6536-6542.

Davis et al., "Phase Behavior and Rheology of SWNT's in Superacids", 37 Macromolecules (2004), pp. 154-160.

Zhou et al., "Single wall carbon nanotube fibers extruded from superacid suspensions: . . ." 95(2) J. Appl. Phys. (2004), pp. 649-655.

Zhou et al., "Preferred Orientation in Fibers of HIPCO SingleWall carbon nanotubes from Diffuse X-Ray Scattering", 740 Mater. Res. Soc. Symp. Proc. (2002), pp. 429-434.

Ramesh et al., "Identification of Large Fullerenes Formed During the Growth of Single-Walled Carbon Nanotubes in the HiPco Process", 108 J. Phys. Chem. B (2004), pp. 8794-8798.

Wang et al., "Continued Growth of Single-Walled Carbon Nanotubes", 5 Nano Lett. (2005), pp. 997-1002.

* cited by examiner

CARBON NANOTUBE SUBSTRATES AND CATALYZED HOT STAMP FOR POLISHING AND PATTERNING THE SUBSTRATES

CROSS-REFERENCE TO RELATED APPLICATIONS

This Application for Patent claims priority to U.S. Provisional Patent Application Ser. No. 60/636,727, filed Dec. 16, 2004.

This invention was made with support from the Department of Energy, Grant No. FWP ERKCS04.

FIELD OF THE INVENTION

The present invention relates generally to carbon nanotubes, and specifically to methods of catalytically etching and patterning such nanotubes, particularly the ends of carbon nanotube fiber assemblies.

BACKGROUND OF THE INVENTION

Carbon nanotubes (CNTs), comprising multiple concentric shells and termed multi-wall carbon nanotubes (MWNTs), were discovered by Iijima in 1991 [Iijima, *Nature* 1991, 354, 56-58]. Subsequent to this discovery, single-wall carbon nanotubes (SWNTs), comprising single graphene sheets rolled up on themselves to form cylindrical tubes with nanoscale diameters, were synthesized in an arc-discharge process using carbon electrodes doped with transition metals [Iijima et al., *Nature* 1993, 363, 603-605; and Bethune et al., *Nature* 1993, 363, 605-607]. These carbon nanotubes (especially SWNTs) possess unique mechanical, electrical, thermal and optical properties, and such properties make them attractive for a wide variety of applications. See Baughman et al., *Science*, 2002, 297, 787-792.

The proclivity of SWNTs to bundle into ropes is well established [Thess et al., *Science*, 1996, 273, 483-487]. More recently, macroscopic fibers have been spun from dispersions of such SWNTs and SWNT ropes [Ericson et al., *Science*, 2004, 305, 1447-1450]. Dry-spun fibers of MWNTs have also been reported [Zhang et al., *Science*, 2004, 306, 1358-1361]. In addition, both MWNTs and SWNTs can be grown as vertically-aligned films [Ren et al., *Science*, 1998, 282, 1105-1107; Hata et al., *Science*, 2004, 306, 1362-1364].

Notwithstanding continuing advances in the production of CNT fibers, efforts to incorporate such CNT fibers into electronic and other devices and structures will likely benefit from the ability to polish and/or pattern the fiber ends, and a convenient method of doing so would be quite beneficial.

BRIEF DESCRIPTION OF THE INVENTION

Generally speaking, the present invention is directed to catalyzed hot stamp methods for polishing and/or patterning carbon nanotubes (CNTs) and fiber and/or other similar such assemblies of CNTs, particularly wherein such polishing and/or patterning is carried out on a CNT fiber end or cross-sectional slice of such a CNT fiber.

In some embodiments, the present invention is directed to methods comprising the steps of: (a) contacting a CNT fiber end with a metal surface to form a CNT-metal interface; and (b) heating the CNT-metal interface in an etching atmosphere at a temperature that permits catalytic etching of the CNT fiber end where it is in contact with the metal surface to provide an end-etched CNT fiber.

In some such above-described embodiments, the CNT fiber comprises carbon nanotubes selected from the group consisting of single-wall carbon nanotubes (SWNTs), multi-wall carbon nanotubes (MWNTs), double-wall carbon nanotubes, small-diameter carbon nanotubes (SDCNTs), and combinations thereof. Generally, such CNT fibers have microscopic and/or macroscopic bulk dimensions.

In some such above-described embodiments the metal surface comprises transition metal. Suitable such transition metals include, but are not limited to Fe, Ni, Co, Pt, Ag, Au, and combinations thereof. Generally, the metal surface serves a catalytic role in the catalytic etching of the CNT fiber end. In some such above-described embodiments, the etching atmosphere comprises a gas selected from the group consisting of $H_2$, $CO_2$, $O_2$, $H_2O$, and combinations thereof.

In some such above-described embodiments, particularly wherein the metal surface is at least microscopically smooth, the end-etched CNT fiber is polished at the end. In some such embodiments, the end-etched CNT fiber has an end with a microscopically-smooth finish. In other embodiments, the metal surface is patterned and serves to transfer said pattern to the end-etched CNT fiber end. In some such above-described embodiments, there further comprises a means of feeding the CNT end into the metal surface as the CNT end is etched. In some such embodiments, the means of feeding involves a piezoelectric device to which the CNT fiber is mounted or otherwise attached. In some such embodiments, there further comprises an establishment of an open electric circuit using the CNT fiber as one electrode and metal surface as the other, wherein a potential is applied to the circuit. In some such embodiments, the CNT fiber is brought into contact with the metal surface so as to close the circuit and establish a current. In some such embodiments, the current flowing through the circuit increases as the CNT fiber is directed into the metal surface while simultaneously being etched, the etching thus producing a microscopically flat fiber end when the current flowing through the circuit stabilizes at a maximum value. Accordingly, the establishment of such a circuit provides a way of monitoring the etching process.

In some such above-described embodiments, there further comprises a cleaning of the end-etched CNT fiber in an acidic solution. In some such above-described embodiments, there further comprises a heating of the end-etched CNT fiber in $H_2$ to remove any surface oxides.

In some such above-described embodiments the end-etched CNT fiber is utilized in an application selected from the group consisting of electrodes, field emitters and arrays thereof, electron sources, displays, and combinations thereof.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
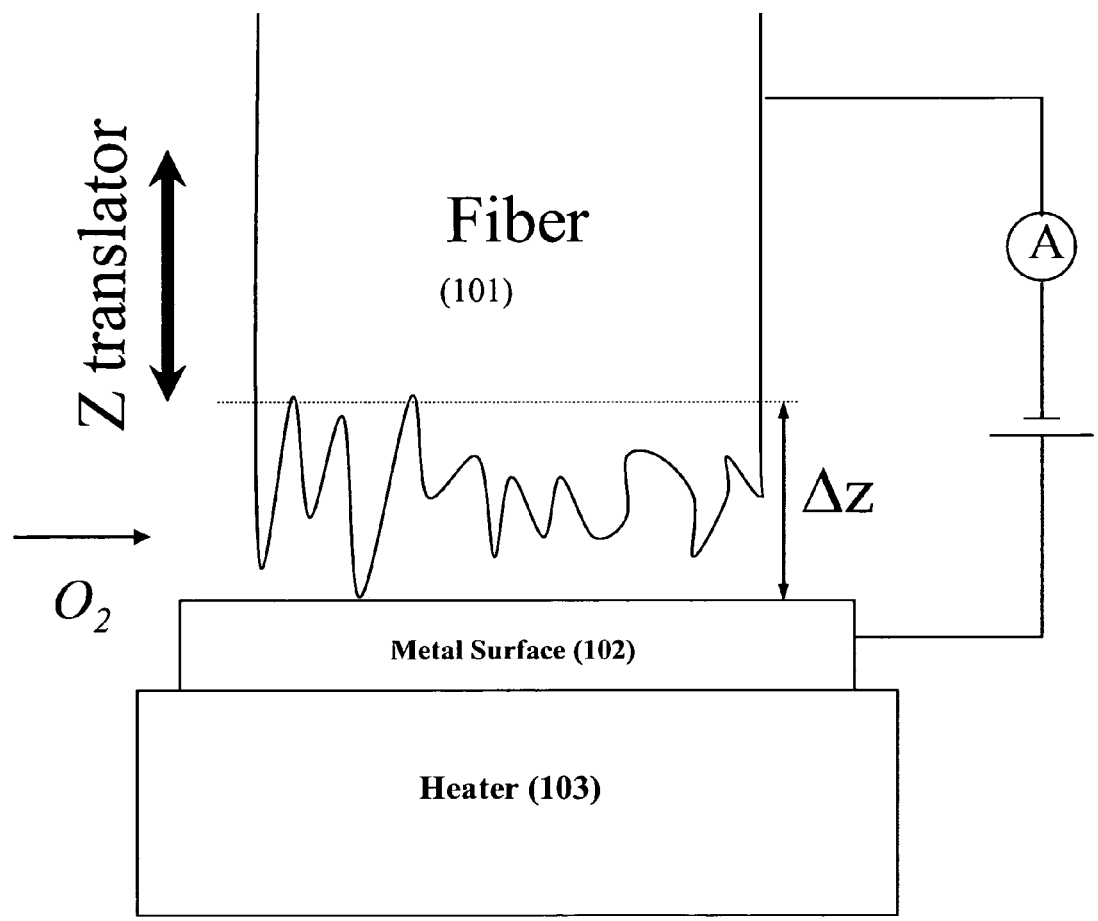
FIG. 1 depicts an embodiment of the present invention wherein a CNT fiber is polished on an atomically flat conductive surface, and wherein the polishing progress is followed by monitoring the current through a circuit established when a rough fiber surface first touches the atomically flat surface and which is maximized when the fiber surface is completely polished.

The present invention is generally directed to catalyzed hot stamp methods for polishing and/or patterning carbon nanotube (CNT)-containing substrates (the substrate). In some embodiments, the substrate (e.g., a CNT fiber end) is brought into contact with a hot stamp (typically held at 200-800° C.), and is kept in contact with the hot stamp until the morphology/patterns on the hot stamp have been transferred to the substrate. Generally, the hot stamp is made of material comprising one or more transition metals (Fe, Ni, Co, Pt, Ag, Au, etc.) operable for catalyzing etching reactions of carbon with $H_2$, $CO_2$, $H_2O$, and/or $O_2$. Embodiments of such methods include (1) polishing a CNT substrate with a microscopically-smooth finish, and (2) transferring patterns that are pre-defined on the hot stamp to the CNT substrate. In some embodiments, metal catalyst can be deposited on such polished or patterned CNT substrates to further grow them upon addition of one or more feedstock gases under suitable reaction conditions, such growth conditions being well established in the art. Such polished or patterned carbon nanotube substrates can also find application as CNT electrodes, field emitters, and field emitter arrays for displays and electron sources.

In some embodiments, methods of the present invention comprise the steps of (a) contacting a CNT fiber end (the substrate) with a metal surface to form a CNT-metal interface; and (b) heating the CNT-metal interface in an etching atmosphere at a temperature that will permit catalytic etching of the CNT fiber end where it is in contact with the metal surface so as to provide an end-etched CNT fiber. As mentioned above, in some embodiments, the end-etched CNT fiber is polished at the end to generate a smooth finish. In some or other embodiments, the end-etched CNT fiber is patterned at the end.

Carbon nanotubes (CNTs), as used herein, generally refer to both single-wall carbon nanotubes (SWNTs) and multi-wall carbon nanotubes (MWNTs). Such CNTs can generally be made by any known process. An exemplary method of making such carbon nanotubes is the HiPco method (Carbon Nanotechnologies, Inc., Bronikowski et al., *J. Vac. Sci. Technol.* 2001, 19, 1800; Nikolaev et al., *Chem. Phys. Lett.* 1999, 313, 91). An exemplary class of carbon nanotubes useful for invention embodiments is small-diameter carbon nanotubes (SDCNTs) whose diameters are generally less than 3 nm, irrespective of the number of tube walls they might possess. Any such suitable CNTs can undergo a variety of post-synthesis processes and/or modifications, such as, but not limited to, cutting [e.g., Gu et al., *Nano Lett.* 2002, 2, 1009-1013; and Ziegler et al., *J. Am. Chem. Soc.* 2005, 127, 1541-1547]; purification [e.g., Chiang et al., *J. Phys. Chem. B* 2001, 105, 1157-1161; Chiang et al., *J. Phys. Chem. B* 2001, 105, 8297-8301]; diameter, length, chirality, and/or (n, m) sorting [e.g., Heller et al., *J. Am Chem. Soc.*, 2004, 126, 14567-14573; Krupke et al., *Science*, 2003, 301, 244-347]; chemical modification [e.g., Ying et al., *Org. Letters*, 2003, 5, 1471-1473, Bahr et al., *J. Am. Chem. Soc.*, 2001, 123, 6536-6542]; and combinations thereof.

CNT fibers are substantially aligned agglomerations of SWNTs and/or MWNTs. In some embodiments, SWNT fibers (a subset of CNT fibers) are spun from a concentrated dispersion of SWNTs in $H_2SO_4$ via an industrially viable wet-jet solution-spinning approach. The details of this process have been described elsewhere [Davis et al., *Macromolecules* 2004, 37, 154-160; Zhou et al., *J. Appl. Phys.* 2004, 95, 649-655; Zhou et al., *Mater. Res. Soc. Symp. Proc.* 2002, 740, 429-434; Ramesh et al., *J. Phys. Chem. B* 2004, 108, 8794-8798]. In some embodiments, the CNT fiber is cut perpendicular to the CNT fiber axis via a microtome, so as to produce a CNT fiber end that is initially relatively smooth [Wang et al., *Nano Lett.*, 2005, 5, 997-1002]. Additionally, CNT substrates other than fibers, such as CNT forests [Ren et al., *Science*, 1998, 282, 1105-1107; Hata et al., *Science*, 2004, 306, 1362-1364] can be polished and/or patterned via the methods described herein.

Generally the metal surface comprises any metal or combination of metals operable for catalyzing reaction of the CNT fiber end with a reactive gas. Typically, the metal surface comprises transition metal. Examples of such metals include, but are not limited to, Fe, Ni, Co, Pt, Ag, Au, and combinations thereof. In some embodiments, the metal surface is microscopically or atomically flat. In some or other embodiments, the metal surface is patterned.

The etching atmosphere generally comprises one or more gases capable of catalytically reacting with the carbon nanotubes to form gaseous products. Suitable such gases include, but are not limited to, $H_2$, $CO_2$, $O_2$, $H_2O$, and combinations thereof. In some embodiments, air is a suitable etching atmosphere.

Figure 2:
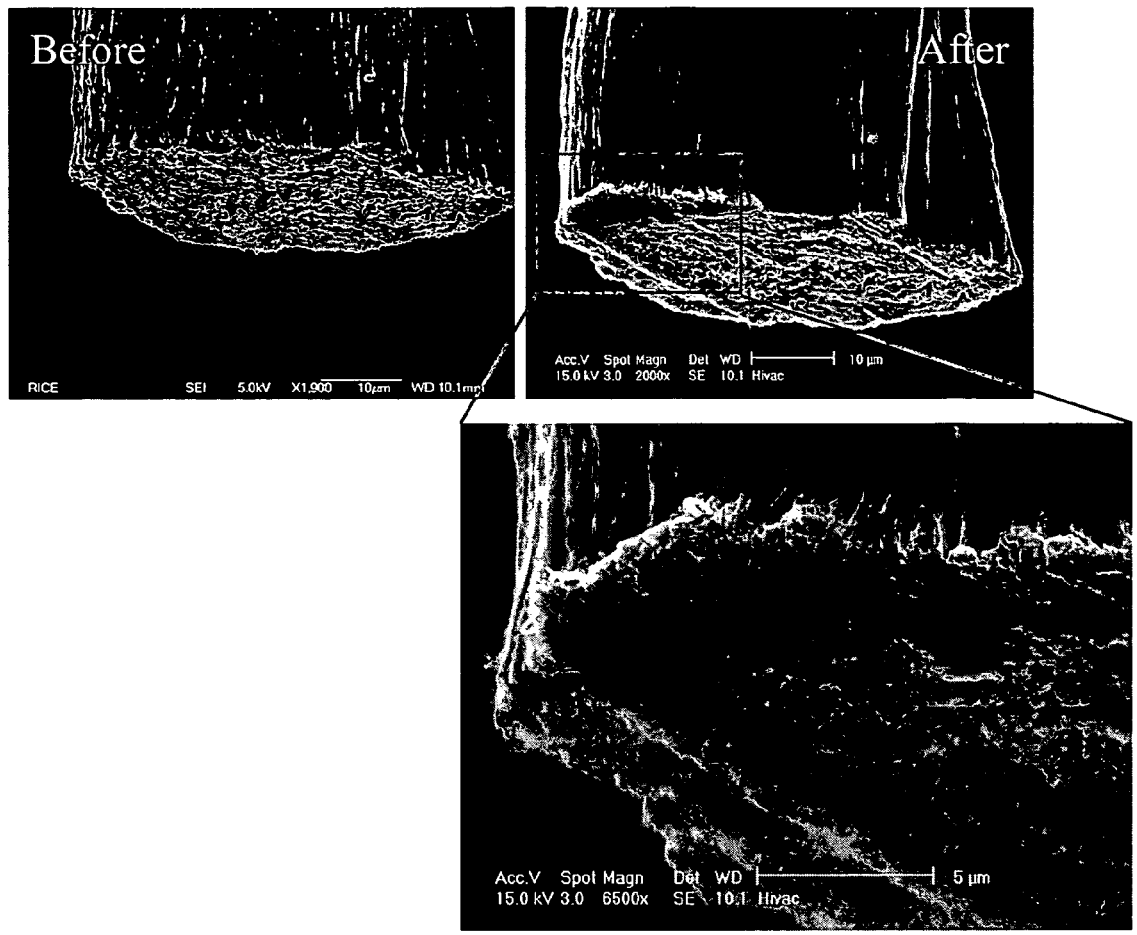
FIG. 2 depicts scanning electron microscopy (SEM) images of a fiber surface before and after (see also selected region at higher magnification) hot stamp patterning in accordance with some embodiments of the present invention.

Some embodiments comprise a means of feeding the CNT end into the metal surface as the CNT end is etched. Referring to FIG. 1, in some of these embodiments, the means of feeding comprises a piezoelectric device to which the CNT fiber 101 is mounted or otherwise associated with and/or attached. In some of these embodiments, there is an establishment of an open electric circuit using the CNT fiber as one electrode and metal surface 102 (or other conductive surface) as the other, wherein a potential is applied to the circuit. In such embodiments, when the CNT fiber is brought into contact with the metal surface, a current is established. The current flowing through the circuit increases as the CNT fiber is directed into the metal surface while simultaneously being etched via heating (such as supplied by heater 103) in an etching atmosphere (e.g., $O_2$). The etching produces a microscopically-flat CNT fiber end when the current flowing through the circuit stabilizes at a maximum value. See scanning electron microscope (SEM) images in FIG. 2, before and after hot stamping, the after image (and correspondingly magnified region) depict a SWNT fiber that has been hot stamped in air at 500° C.±10° C., wherein the voltage across the substrate/metal surface region was 0.5V.

In some embodiments, one or more post-etching/polishing steps are employed. Such steps include cleaning the end-etched carbon fiber in an acidic solution and/or heating the end-etched CNT fiber in $H_2$ to remove any surface oxides.

A number of variations on the above-described embodiments exist. For example, (1) the temperature of the hot stamp can be varied from 200-800° C.; and (2) the partial pressure of the gas or gases of which the etching atmosphere is comprised can be varied from 1 mTorr to 10 atm.

Regarding the above-mentioned variations, the choice of a particular combination of hot-stamp material, the temperature, and the etching environment can be optimized according to the following criteria: (a) to avoid significant roughing/deformation of the hot stamp due to oxidizing (or rusting for Fe), melting, and/or surface re-organization [Note: liquidlike behavior of metal occurs above the Tamman point (0.52*melting temperature at K)]; (b) to minimize the reaction temperature [Note: Desirable temperature ranges can be determined from thermal analysis experiments, TGA or DSC of a mixture of CNTs with the chosen metal(s)]; (c) to minimize the heat radiation/conductance from the hot stamp to the substrate; (d) to minimize the diffusion of metals into the substrate; (e) to maximize the etching rate; and (f) to allow for ease of metal removal from the polished surface (if necessary).

In some exemplary embodiments, the hot stamp can be made of Co, and the etching occurs with $CO_2$. In some exemplary embodiments, the substrate can be SWNT neat fibers, vertical aligned films, or any other CNT-containing solids. When an electric circuit is used to monitor etching progress, 0-5 Volts can be applied to the circuit as long as it does not cause arc discharge.

In some embodiments, the hot stamp can be combined with Ohmic heating (with a power density of <1 $mW/\mu m^2$) in order to further enhance the local heating due to contact. In some embodiments, the stamp and the substrate may be in relative rotation motion. In some embodiments, the hot stamp can be atomically flat or can have predefined patterns to be transferred to the substrate. In some embodiments, the hot stamp can be prepared by depositing metals onto a flat substrate (such as $SiO_2$, or a Si wafer) by e-beam and/or thermal evaporation. In some embodiments, the substrate may need to be cooled down in order to avoid significant temperature increase as a bulk.

In some embodiments, instead of using a catalyzed hot stamp, the polishing can be initiated by establishing an electric discharge or corona between the substrate and the stamp.

The catalyzed hot stamp methods described herein can be used as general purpose methods to polish/planarize or transfer predefined patterns to carbon surfaces in general (including diamond, diamond-like carbon, and other types of carbon nanotube substrates). This creates new devices and structures such as bulk carbon nanotube flat electrodes, templates, and field emitter arrays. The substrate could be used as a starting seed for continued growth of the same. The present invention also may facilitate the preparation of existing diamond wafers and windows that are indispensable in some optical applications.

The present invention is an enabling technique in that it can create an almost atomically-flat CNT substrate—which was previously not possible. Also, the scaling up to a macroscopic area (e.g., on the order of inches) is straightforward. The CNT substrates described herein are novel constructions that could find wide application, as stated above.

The following examples are provided to demonstrate particular embodiments of the present invention. It should be appreciated by those of skill in the art that the methods disclosed in the examples which follows merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLE 1

This example serves to illustrate a procedure for polishing a SWNT neat fiber in accordance with some embodiments of the present invention.

A platinum foil/disk is placed on a button heater and heated to ca. 350° C. in flowing $O_2$ (Step 1). A SWNT neat fiber is then mounted to a manipulator with piezo linear motion along the fiber axis (Step 2). The fiber axis is oriented approximately perpendicular to the stainless steel (SS) foil. Next, an open circuit is established using the SWNT fiber as one electrode and the SS foil as the other (Step 3). Typically, 0.5 V is applied to the circuit. The current is recorded and used as a feedback to control the movement of the linear translator. The SWNT fiber is brought close to the SS foil until a current is established (Step 4). The occurrence of the current indicates that the SWNT fiber tip (or at least part of it) is in intimate contact with the platinum foil. As the current drops to about the noise level, the SWNT fiber is brought closer until the current is re-established (Step 5). Step 5 can be repeated until the current reaches a maximum value (or the current change between two consecutive iterations of Step 5 approache the noise level). After polishing, the current is allowed to drop to about the noise level (Step 6). The fiber is then withdrawn (Step 7).

The polished SWNT fiber tip can be cleaned with 1N HCl solution (Step 8), after which Steps 4-8 can be repeated. The SWNT substrate can then be heated in $H_2$ up to 800° C. to remove the surface oxides.

EXAMPLE 2

This example serves to further illustrate a representative hot stamp polishing setup, useful for implementing some methods of the present invention, such as is shown in FIG. 1.

Key features of a catalyzed hot stamp polishing setup may include any or all of the following: (1) a piezo actuator that allows movement at steps of 20 nm or less; (2) a microscope (40× or better) that is capable of seeing the CNT fiber approaching its mirror image from a shiny metal surface; (3) a picoampmeter to measure the current increase when the CNT fiber is brought into contact with the hot metal surface; (4) a feedback control using the detecting circuit as a very sensitive feedback to synchronize the CNT fiber motion with the etching speed; (5) 6 degrees of motion that is capable of aligning the CNT substrate (where applicable) parallel to the metal surface (hot stamp); (7) keeping both the substrate and the hot stamp in mechanical registry during the reaction (perhaps by mounting both the substrate and the hot stamp on a magnetic spring similar to what is used in scanning tunneling microscopy (STM) to avoid the vibration of the substrate and STM tip). Additionally, the following features are important for preventing the CNT fiber from crashing into the metal surface: (1) the hot stamp may be placed above the substrate to minimize hot gas diffusion into the substrate, or the substrate may be in contact with a cold reservoir to maintain a constant low temperature; and (2) the hot stamp may rotate relative to the substrate, or scan across a large area of substrate.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method comprising the steps of:
   a) contacting a carbon nanotube (CNT) fiber with a metal surface to form a CNT-metal interface;
      wherein the contacting step comprises translating the CNT fiber to the metal surface; and
      wherein the CNT fiber contacts the metal surface at an end of the CNT fiber; and
   b) heating the CNT-metal interface in an etching atmosphere at a temperature that permits catalytic etching of the end of the CNT fiber to provide an end-etched CNT fiber.

2. The method of claim 1, wherein the CNT fiber comprises single-wall carbon nanotubes.

3. The method of claim 1, wherein the metal surface comprises a transition metal.

4. The method of claim 1, wherein the metal surface comprises a metal selected from the group consisting of Fe, Ni, Co, Pt, Ag, Au, and combinations thereof.

5. The method of claim 1, wherein the etching atmosphere comprises a gas selected from the group consisting of $H_2$, $CO_2$, $O_2$, $H_2O$, and combinations thereof.

6. The method of claim 1, wherein the end of the end-etched CNT fiber is polished during etching through contact with the metal surface.

7. The method of claim 1, wherein the end of the end-etched CNT fiber is patterned during etching through contact with the metal surface.

8. The method of claim 1, wherein the end of the end-etched CNT fiber is made microscopically smooth during etching through contact with the metal surface.

9. The method of claim 1, wherein the end-etched CNT fiber is utilized in an application selected from the group consisting of electrodes, field emitters and arrays thereof, electron sources, displays, and combinations thereof.

10. The method of claim 1, further comprising cleaning the end-etched CNT fiber in an acidic solution.

11. The method of claim 1, further comprising heating the end-etched CNT fiber in $H_2$ to remove any surface oxides on the end of the end-etched CNT fiber.

12. The method of claim 1, further comprising feeding the end of the CNT fiber into the metal surface as the end of the CNT fiber is etched.

13. The method of claim 12, wherein the step of feeding utilizes a means of feeding the end of the CNT fiber into the metal surface.

14. A method comprising the steps of:
   a) contacting a carbon nanotube (CNT) fiber with a metal surface to form a CNT-metal interface,
      wherein the CNT fiber contacts the metal surface at an end of the CNT fiber;
   b) heating the CNT-metal interface in an etching atmosphere at a temperature that permits catalytic etching of the end of the CNT fiber to provide an end-etched CNT fiber; and
   c) feeding the end of the CNT fiber into the metal surface as the end of the CNT fiber is etched,
      wherein the step of feeding utilizes a piezoelectric device to which the CNT fiber is mounted.

15. The method of claim 14, wherein a potential exists between the metal surface and the CNT fiber prior to forming the CNT-metal interface; and
    wherein the CNT fiber forms a first electrode of an open electric circuit and the metal surface forms a second electrode of the open electric circuit.

16. The method of claim 15, wherein the CNT fiber is brought into contact with the metal surface to establish a closed electric circuit through which current flows.

17. The method of claim 16, wherein the current flowing through the closed electric circuit increases as the CNT fiber is directed into the metal surface while simultaneously being etched, the etching producing a microscopically flat fiber end when the current flowing through the circuit stabilizes at a maximum value.

18. A method comprising the steps of:
   a) contacting a single-wall carbon nanotube (SWNT) fiber with a transition metal surface to form a SWNT-metal interface;
      wherein the contacting step comprises translating the SWNT fiber to the transition metal surface; and
      wherein the SWNT fiber contacts the transition metal surface at an end of the SWNT fiber; and
   b) heating the SWNT-metal interface in an etching atmosphere at a temperature that is operable for catalytic etching of the end of the SWNT fiber to provide an end-etched SWNT fiber.

19. The method of claim 18, wherein the etching atmosphere comprises a gas selected from the group consisting of $H_2$, $CO_2$, $O_2$, and combinations thereof.

20. The method of claim 18, wherein the end of the end-etched SWNT fiber is polished during etching through contact with the metal surface.

21. The method of claim 18, wherein the end of the end-etched SWNT fiber is patterned during etching through contact with the metal surface.

22. The method of claim 18, further comprising feeding the end of the SWNT fiber into the metal surface as the end of the SWNT fiber is etched.

23. The method of claim 22, wherein the step of feeding utilizes a means of feeding the end of the SWNT fiber into the metal surface.

24. A method comprising the steps of:
   a) contacting a small-diameter carbon nanotube (SDCNT) fiber with a transition metal surface to form a SDCNT-metal interface;
      wherein the contacting step comprises translating the SDCNT fiber to the transition metal surface; and
      wherein the SDCNT fiber contacts the transition metal surface at an end of the SDCNT fiber; and
   b) heating the SDCNT-metal interface in an etching atmosphere at a temperature that is operable for catalytic etching of the end of the SDCNT fiber to provide an end-etched SDCNT fiber.

25. The method of claim 24, wherein the etching atmosphere comprises a gas selected from the group consisting of $H_2$, $CO_2$, $O_2$, $H_2O$, and combinations thereof.

26. The method of claim 24, wherein the end of the end-etched SDCNT fiber is polished during etching through contact with the metal surface.

27. The method of claim 24, wherein the end of the end-etched SDCNT fiber is patterned during etching through contact with the metal surface.

* * * * *

UNITED STATES PATENT AND TRADEMARK OFFICE
CERTIFICATE OF CORRECTION

| | |
|---|---|
| PATENT NO. | : 7,585,420 B2 |
| APPLICATION NO. | : 11/300031 |
| DATED | : September 8, 2009 |
| INVENTOR(S) | : Yuhuang Wang et al. |

Page 1 of 1

It is certified that error appears in the above-identified patent and that said Letters Patent is hereby corrected as shown below:

Column 1, lines 11 - 12 should read as follows: This invention was made with government support --under Grant Number DE-AC05-00OR22725 awarded by the Department of Energy. The government has certain rights in the invention.-- The original text "from the Department of Energy, Grant No. FWP ERKCS04." should be cancelled.

Signed and Sealed this

Ninth Day of February, 2010

David J. Kappos
*Director of the United States Patent and Trademark Office*

UNITED STATES PATENT AND TRADEMARK OFFICE
Certificate

Patent No. 7,585,420 B2                                    Patented: September 8, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Yuhuang Wang, Evanston, IL (US); Robert H. Hauge, Houston, TX (US); Howard K. Schmidt, Houston, TX (US); Myung Jong Kim, Houston, TX (US); W. Carter Kittrell, Houston, TX (US); Richard E. Smalley, Houston (deceased), TX (US); and Irene M. Marek, legal representative, Houston, TX (US).

Signed and Sealed this Twenty-fifth Day of May 2010.

PARVIZ HASSANZADEH
*Supervisory Patent Examiner*
Art Unit 1716